US006524228B1

United States Patent
Schrörs

(12) United States Patent
(10) Patent No.: US 6,524,228 B1
(45) Date of Patent: Feb. 25, 2003

(54) DEFLECTION ROLLER WITH MECHANICAL STOP

(75) Inventor: Günter Schrörs, Tönisvorst (DE)

(73) Assignee: Eduard Kusters Maschinenfabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 09/744,499

(22) PCT Filed: Jul. 16, 1999

(86) PCT No.: PCT/EP99/05101

§ 371 (c)(1),
(2), (4) Date: Mar. 30, 2001

(87) PCT Pub. No.: WO00/05512

PCT Pub. Date: Feb. 3, 2000

(30) Foreign Application Priority Data

Jul. 24, 1998 (DE) .......................................... 198 33 308

(51) Int. Cl.$^7$ ................................................ B23P 15/00
(52) U.S. Cl. .................................. 492/7; 492/1; 492/16
(58) Field of Search .............................. 492/1, 2, 7, 16, 492/17, 18, 20; 162/358.2, 358.1, 358.3, 359.1; 100/153, 162 B, 163 A

(56) References Cited

U.S. PATENT DOCUMENTS

| 2,395,915 | A | | 3/1946 | Specht | |
|---|---|---|---|---|---|
| 4,480,452 | A | | 11/1984 | Schnyder | |
| 4,530,227 | A | | 7/1985 | Schlatter et al. | |
| 4,651,547 | A | | 3/1987 | Morel et al. | |
| 5,685,813 | A | | 11/1997 | Kivioja et al. | |
| 5,979,305 | A | * | 11/1999 | Wadzinski | 100/162 B |
| 5,984,847 | A | * | 11/1999 | Brown et al. | 492/2 |
| 6,174,272 | B1 | * | 1/2001 | Savia | 492/16 |
| 2002/0088353 | A1 | * | 7/2002 | Brendel et al. | 100/35 |

FOREIGN PATENT DOCUMENTS

| CH | 587 689 | 5/1977 |
|---|---|---|
| CH | 673 415 | 3/1990 |
| DE | 1 561 706 | 2/1973 |
| DE | 22 30 139 | 1/1980 |
| DE | 29 42 002 | 5/1981 |
| DE | 39 18 989 | 12/1990 |
| DE | 40 12 805 | 5/1991 |
| DE | 39 28 439 | 6/1994 |
| DE | 38 20 974 | 3/1996 |

* cited by examiner

Primary Examiner—I Cuda Rosenbaum
(74) Attorney, Agent, or Firm—Kenyon & Kenyon

(57) ABSTRACT

A roller (100) for the pressure treatment of fabric webs includes a hollow cylinder (1), rotatable about its axis A and bearing the working roller periphery (4). A non-rotatable crosshead (5) extends through the hollow cylinder (1) along its length, leaving all around a distance with respect to the inner circumference (2) of the hollow cylinder (1). The cylinder (1) is supported at the ends on external support pieces. A support device (10) is arranged on the crosshead (5) and acts radially in the active plane (W) of the roller (100) against the inner circumference (2) of the hollow cylinder (1). The support device transmits from the crosshead (5) to the hollow cylinder (1) the forces that are necessary for creating the line forces exerted by the roller (100). Provided laterally on the crosshead (5) is a hydrostatic support element (30) acting radially perpendicular to the active plane (W) of the roller (100) against the inner circumference (2) of the hollow cylinder (1). The hydrostatic support element (30) is hydraulically extendable against the inner circumference (2) of the hollow cylinder (1) and has on the exterior side an arrangement of hydrostatic bearing pockets (60) that are open towards the inner circumference (2) of the hollow cylinder (1). The bearing pocket arrangement (60) of the lateral support element (30) can be acted upon in a throttle-free manner by a hydraulic fluid quantity that is constant over time. For the lateral support element (30), a mechanical limit stop (55, 42) is provided for limiting the lateral extension motion.

5 Claims, 1 Drawing Sheet

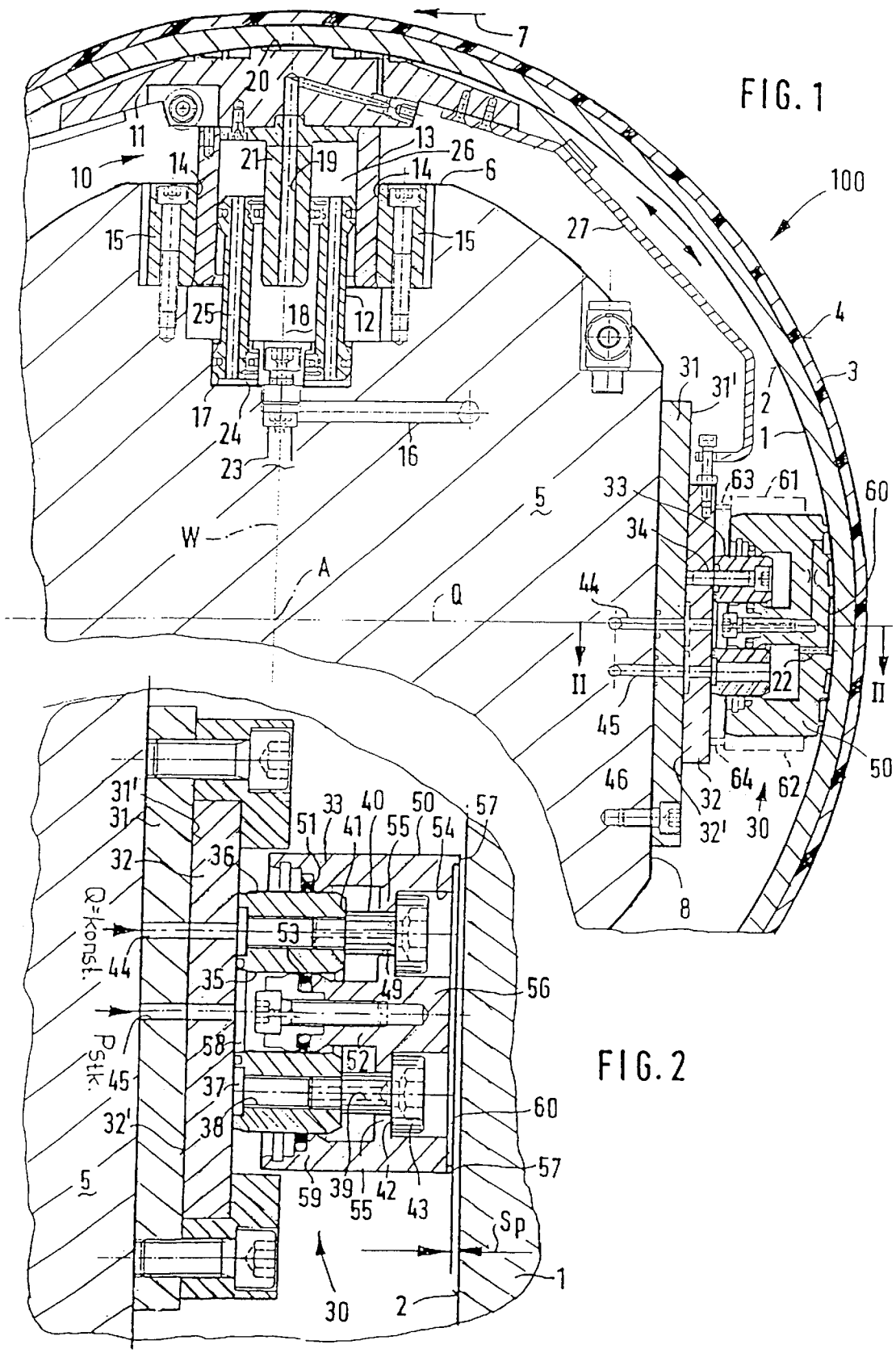

DEFLECTION ROLLER WITH MECHANICAL STOP

FIELD OF THE INVENTION

The present invention relates to a roller for the pressure treatment of a fabric web.

BACKGROUND OF THE INVENTION

A roller for the pressure treatment of a fabric web is known from German Patent 29 42 002 A1. In particular, FIGS. 9 through 12 of that patent show a roller which has a hollow cylinder that can rotate about an axis. A non-rotatable cross-head extends through the hollow cylinder. Lateral support elements are mounted on the cross-head. As a result of the lateral support elements, additional forces can be exerted on the hollow cylinder perpendicular to its active plane, i.e., in general, parallel to the web.

A roller for the pressure treatment of a fabric web is subject during operation not only to forces lying precisely in the active plane. Rather, forces also arise that are perpendicular to the active plane, whether as a result of the driving forces of the fabric web, or as a result of the deformation resistance of the latter, or as a result of incorrectly calculated driving power, when the roller is driven. If the driving power is set too high, it can lead, for example, to the roller tending to operate in advance contrary to the direction of motion of the fabric web, which, since the roller is generally fixedly supported at its ends, can lead to a deformation of the roller in a plane that is parallel to the web. The same applies in the case of insufficient driving power, if the web thus carries the roller along with it and deforms it in the direction of motion.

If relatively thin-walled roller tubes made of steel, or especially plastic, are used, (whose bending resistance is not very high in comparison to thick-walled rollers made of steel), all stresses perpendicular to the active plane lead especially to noticeable deformations in the roller in a plane that is perpendicular to the active plane.

A deformation-controllable roller having lateral support elements can be seen from German Patent AS 22 30 139, FIG. 9. In this roller, however, four mating rolls are arranged around the roller offset by 90° with respect to each other. The mating rolls, along with the roller, form four roller gaps. Therefore, the deformation of a free roller parallel to a web that is moving essentially in a planar fashion is not emphasized in this context.

In the known embodiments of rollers having lateral support elements, it is true that lateral forces can be exerted on the hollow cylinder by applying a predetermined pressure in the support element. However, in these embodiments, the position of the support element of the hollow cylinder is determined as a function of the equivalence of forces and is not established geometrically. Therefore, it is not possible, using the known embodiments, to position the hollow cylinder in a plane that is perpendicular to the active plane.

SUMMARY OF THE INVENTION

The object of the present invention is to design a deflection controlled roller so that a positioning of the hollow cylinder perpendicular to the active plane is achieved.

This objective in a first aspect is achieved by a roller which has a hollow cylinder that can rotate about an axis A and that supports the working roller periphery. A non-rotatable crosshead extends through the length of the hollow cylinder, leaving all around a distance with respect to the inner circumference of the hollow cylinder. The crosshead is supported at its ends on external support pieces. A support device is arranged on the crosshead and acts radially in the active plane of the roller against the inner circumference of the hollow cylinder. The support device transmits the forces necessary for creating the line forces exerted by the roller from the crosshead to the hollow cylinder. At least one hydrostatic support element is arranged laterally on the crosshead and acts radially perpendicular to the active plane of the roller against the inner circumference of the hollow cylinder. The hydrostatic support element is hydraulically extendable against the inner circumference of the hollow cylinder and has on the exterior side an arrangement of hydrostatic bearing pockets that are open with respect to the inner circumference of the hollow cylinder. The bearing pocket arrangement of the lateral support element can be supplied in a throttle-free manner with hydraulic fluid quantity that is constant over time. A mechanical limit stop is provided for limiting the lateral extension motion of the lateral support element.

The lateral support element is hydraulically extendable. However, the extension is only possible until the limit stop is reached. In this position, the support element stops. A quantity of hydraulic fluid that is constant over time and that escapes over the edge of the bearing pockets is continually conveyed into the bearing pockets. Between this closed, circumferential edge and the inner circumference of the hollow cylinder there is a certain gap. When, as a result of a deformation perpendicular to the active plane, the inner circumference of the hollow cylinder approaches the edge of the bearing pocket arrangement, stationary with respect to the crosshead, both the gap and the escape-flow cross-section provided by it are reduced, and the pressure in the bearing pocket arrangement rises. With it, there is also an increase in the force exerted on the inner circumference of the hollow cylinder by the support element counteracting the deformation of the hollow cylinder that has occurred. In this manner, an equilibrium is achieved. In this way, care is taken that the hollow cylinder is always in a predetermined position—seen from a point of view perpendicular to the active plane.

The predetermined position is determined by the position of the limit stop or stops. It is obvious that this position is selected such that in the normal case, i.e. when the hollow cylinder is not deformed perpendicular to the active plane, no forces acting to deform the hollow cylinder are exerted upon it. In the normal case, care is taken that the gap at the lateral support element amounts to roughly 0.5 mm. In the case of support elements opposite each other and perpendicular to the active plane, this gap is specified in both support elements.

This means, in normal operation, that the quantity of hydraulic fluid conveyed constantly over time to the bearing pocket arrangement can flow, in a practically pressure-free manner, into the interstitial space between the crosshead and the inner circumference of the hollow cylinder, from where it is continually drawn off. In normal operation, the lateral support elements are therefore in a practical sense not active. They only begin to carry out their function when the gap on one or the other side begins to change perpendicular to its active plane as a result of an undesirable deformation of the hollow cylinder. Then the pressure on the side having the decreasing gap rises, and a force is exerted upon the hollow cylinder in opposition to the deformation.

The length of the lateral support elements in the roller longitudinal direction amounts to roughly $1/100$ to $1/20$ of the length of the roller. In general, over the length of the roller there will be a few, e.g., three or four, given a normal roller length of 3 to 8 m, lateral support elements of this type, support elements of this type being situated opposite each other on both sides of the crosshead, assuming deformations of the hollow cylinder are possible in both directions.

As used herein the "bearing pocket arrangement" is taken to mean both an individual bearing pocket as well as a group of two, three, or four bearing pockets, introduced in the contact surface of the support element, which can be provided for balancing the forces on the support element.

The "mooring" of a hydrostatic support element at a predetermined maximum position using a mechanical limit stop is, taken by itself, known from German Patent 39 18 989 C1. However, in this context, a support element of a different type is involved, which is arranged in the active plane of the roller and aids in positioning the hollow cylinder in the effective direction in cooperation with the support elements that generate the line forces.

The mechanical limit stop can be formed by the head of a bolt fixed on the crosshead. The bolt can at the same time act to convey the constant quantity of hydraulic fluid to the bearing pocket arrangement.

One important embodiment of the present invention is characterized in that the lateral support element is mechanically connected to the part of the support device that contacts the inner circumference of the hollow cylinder. The support element with respect to the crosshead can be displaced in the active plane perpendicular to the roller gap. In particular, a retaining bracket can be mounted on the part of the support device that contacts the inner circumference of the hollow cylinder. The retaining bracket contacts a base plate of the support element. The base plate at a planar sliding surface is displaceable on a corresponding sliding surface on the crosshead parallel to the active plane perpendicular to the roller gap.

By being connected to the part of the support device contacting the inner circumference of the hollow cylinder, i.e., for example, to a corresponding hydrostatic or hydrodynamic support shoe, the respective lateral support element can be tracked such that it continually remains positioned at the center of the hollow cylinder and its force, irrespective of the deformation of the crosshead, is always exerted against the widest location of the hollow cylinder, so that no undesirable secondary components of the force arise.

In another aspect of the present invention the roller has a hollow cylinder that can rotate about an axis A. The cylinder supports the working roller periphery. A non-rotatable crosshead extends through the hollow cylinder along its length, leaving all around a distance with respect to the inner circumference of the hollow cylinder. The crosshead is supported at its ends on external support pieces. A support device is arranged on the crosshead and acts radially in the active plane of the roller against the inner circumference of the hollow cylinder. The support device transmits the forces necessary for creating the line forces exerted by the roller from the crosshead to the hollow cylinder. A detection device, emits a distance signal representing the radial distance of the inner circumference of the hollow cylinder from the active plane perpendicular to the latter. A control device processes the distance signal, and controls the drive.

In this context, it is not the exertion of a force by at least one lateral support element that is emphasized so as to counteract a deformation or displacement of the hollow cylinder perpendicular to the active plane, but rather this deformation or displacement is influenced by a corresponding controlling of the drive, such that the hollow cylinder always remains in the correct position or alignment. In principle, there is no necessity, for this purpose, for forces to be exerted against the inner circumference of the hollow cylinder perpendicular to the active plane. Thus the deviation of the position of the hollow cylinder can be detected using the detection device, and the hollow cylinder can be repositioned accordingly.

The detection device can include at least one pressure foot, arranged laterally on the crosshead and acting in a radially perpendicular manner with respect to the active plane of the roller, the pressure foot having a measuring transducer which generates the signal reflecting the displacement of the pressure foot.

In particular, the measuring transducer, can be an inductive length-measuring transducer, because measuring transducers of this type are relatively small and robust, so that they can be arranged in the space between the inner circumference of the hollow cylinder and the lateral surface of the crosshead. In designing this arrangement, the worker skilled in the art has available to him a multiplicity of possibilities.

In the preferred exemplary embodiment, there are simultaneously present in the roller at least one transverse hydrostatic support element and one detection device for the distance of the inner circumference of the hollow cylinder from the active plane of the latter, so that the control device can therefore fall back on the signal of the detection device as well as on the pressure signal of the support element, for example such that, in the event that the displacements of the hollow cylinder are not very great, the drive is influenced already by the signal of the detection device, and an increased influencing of the drive performance only occurs in response to powerful displacement forces that cause the pressure to rise steeply.

The present invention provides for the possibility of regulating the driving power of a roller driven in accordance with the present invention. For when the driving power is not precisely correct, the roller either has a tendency to run ahead of the web moving in contact with it, or, if the driving power is too small, it is carried along by the web. In both cases, forces arise acting on the roller parallel to the web, i.e., perpendicular to the active plane, and these forces lead to a deformation of the hollow cylinder, resulting in the already mentioned gap and pressure change at the bearing pockets.

According to one embodiment of the present invention, this pressure change in the bearing pockets can be used for regulating the driving power such that no forces arise perpendicular to the active plane. However, the control of the driving power can be carried out exclusively on the basis of the measured displacement of the hollow cylinder with respect to the crosshead. Both methods of control (i.e., pressure & measurement) may be used in combination.

An exemplary embodiment of the present invention is depicted in the drawings.

BRIEF DESCRIPTION OF THE DRAWINGS

FIG. 1 depicts a partial cross section of a roller according to the present invention;

FIG. 2 depicts a cutaway view of the lateral support element across line II—II in FIG. 1.

DETAILED DESCRIPTION OF THE INVENTION

The roller, designated as a whole in FIG. 1 as reference numeral 100, includes a hollow cylinder 1 rotating about axis A. The hollow cylinder in the exemplary embodiment is made of a fiber-reinforced plastic and has on the exterior side a coating 3 made of a different suitable plastic. The coating 3 constitutes the working roller periphery 4.

The hollow cylinder 1 has extending through it along its length a crosshead 5. The cylinder 5 is supported at its ends in external bracing elements, e.g., a cylinder creel or the balancers of a calendar. The crosshead 5 is configured as a massive steel girder, which essentially fills the interior cross section of the hollow cylinder 1, to achieve the greatest possible bending resistance, while nevertheless maintaining, all around, a distance with respect to an inner circumference 2 of the hollow cylinder 1.

The crosshead 5 on its upper side (according to FIG. 1) has a flattened-off area 6. A hydrostatic support device 10 is arranged on the flattened off area 6 and acts from inside against the hollow cylinder 1 in the direction of a roller gap 7, situated above in the exemplary embodiment, and which applies the forces that are determinative for the line force in the roller gap 7. The forces of the same magnitude act as opposing forces from above against crosshead 5, which as a result is bent downward. This is the reason for the distance being all around. Furthermore, the crosshead 5 on its lower side can have a flattened-off area (not visible in FIG. 1) similar to the flattened-off area 6, so that in the event of a powerful deformation, it does not come into contact with the inner circumference 2 of the hollow cylinder 1.

The direction of the force exerted by the support device 10 determines an active plane W, which is generally given by the connecting plane of the axis of roller 100 and a mating roller cooperating with the roller and arranged above the roller gap 7.

As a result of the depicted design, the hollow cylinder 1 remains straight under the line forces operating in the roller gap 7. The forces opposing the line forces are absorbed by the crosshead 5, which can bend independently of the hollow cylinder, and in this manner keeps the hollow cylinder 1 free from deformations.

The support device 10 includes a support bar 11 extending along the hollow cylinder 1. The support bar is shaped at its upper side in accordance with the inner circumference 2 of the hollow cylinder 1 and has there hydrostatic bearing pockets 20. The bearing pockets 20 can be filled with hydraulic fluid, which escapes over the edge of the bearing pockets 20. In this manner, the support bar 11 is supported on the inner circumference 2 of the hollow cylinder 1 by a liquid cushion or a liquid film and with respect to the inner circumference does not experience any dry friction when the hollow cylinder 1 rotates in the direction of the arrow.

Guide sleeves 13 are provided on the lower side of the support bar 11 and are distributed over its length. The sleeves have a roughly radial axis and at their exterior side contact, so as to slide in their axial direction, guide pieces 15. The guide pieces are provided on both sides with corresponding partially cylindrical recesses 14, and are set into the flattened-off upper side 6 of the crosshead 5.

The guide pieces 15 only need to engage in two guide sleeves 13 in the central area of the roller 100—seen in its longitudinal direction—, and they position the support bar 11 in a plane parallel to axis A, perpendicular to active plane W. In other words, the support bar 11 is fixed in the axial direction against swiveling in the aforementioned plane. However, perpendicular to this, the support bar 11 can be freely displaced with respect to the guide pieces 15 and the crosshead 5.

The hydraulic fluid is conveyed from the interior of the crosshead 5 through a channel 16 to a connecting sleeve 12, which at one end is movable and sealed in a planar blind hole 17 of the crosshead 5 and at the other end is movable and sealed at the inner circumference of the guide sleeve 13.

The hydraulic fluid conveyed via the line 16 enters the interior 18 of the connecting sleeve 12 and from there, via a channel 19 of a support sleeve 21 connected to the support bar 11 and engaging in the connecting sleeve 12 in a sealed-off manner, flows into the support bar 11 and, via restricter ducts 22 of the latter, into the bearing pockets 20. A second quantity of hydraulic fluid is conveyed via a line 23 in the interior of the crosshead 5 and initially flows into a planar cylinder chamber 24 in the blind hole 17 under the connecting sleeve 12. The wall of the latter has bore holes 25 parallel to the axis, through which this hydraulic fluid overflows into a chamber 26 formed in guide sleeve 13 above the connecting sleeve 12. The pressure existing in this chamber provides the application pressure, which presses the support bar 11 against the inner circumference 2 of the hollow cylinder 1.

The illustrated hydrostatic support device 10 is not the only possible device according to the present invention. It is also possible to use support devices having separate support elements such as those showing German Patent AS 22 30 139 or German Patent 38 20 974 C3, support devices having pressure bars extending hydrodynamically over its length and being supported on the inner circumference 2 of the hollow cylinder 1, such as the one shown in German Patent PS 15 61 706, or even mechanical support devices, such as the one shown in U.S. Pat. No. 2,395,915.

In addition to the support device 10, which applies the forces for generating the line forces in roller gap 7 and which operates in the active plane W, individual, lateral support elements 30 distributed over the length of roller 100 are provided. The lateral support elements 30 support and position the hollow cylinder 1 against displacements in a transverse plane Q, which is aligned perpendicular to the active plane W. For mounting the support elements 30, the crosshead has flattened-off areas 8 on at least one side. In practice, the cross-head has flattened-off areas 8 on both sides opposite each other, which are located parallel to active plane W (and perpendicular to flattened-off area 6).

Base plates 31, 32 are mounted in the radial direction one over the other on the flattened-off areas for each support element 30. Given normal roller length in the range of 3 to 8 m, three or four lateral support elements 30 are provided over the length. Each inner base plate 31 is bolted to the flattened-off area 8 and has, on the outside, a planar slide area 31'. A corresponding external base plate 32, opposite, can be displaced on its inner, planar sliding surface 32' in the effective direction of the roller in the direction of arrow 46 and, in this context, takes support elements 30 with it. A retaining bracket 27 connects the exterior base plate 32 to the support bar 11. The support element 30, as a result, always remains at the level of the center of the hollow cylinder 1 (i.e., at the "Meridian" of the hollow cylinder 1) irrespective of how the crosshead 5 is deformed under the influence of the forces (i.e., displaced upwards or downwards at an interface, corresponding to FIG. 1).

The movable exterior base plate 32 supports on its exterior side a rotary piston 33. The rotary piston 33 has an axis perpendicular to the working plane W, and is secured on the base plate 32 by bolts 34. The rotary piston 33 has a cylindrical inner circumferential surface 35 and a cylindrical outer circumferential surface 36, concentric with respect to the former. In the base of the rotary piston 33 facing the outer side of the base plate 32, an annular chamber 37 is formed. The chamber 37 is sealed to the outside. At a plurality of locations distributed over its circumference, the rotary piston 33 has threaded bore holes 38, parallel to the axis, into which bolts 40 are screwed. The bolts 40 have a central through-hole 39 of a practically throttle-free cross section and have on the exterior side a shoulder 41. The shoulders 41 contact the exterior end face of the rotary piston 33, when the bolts are completely screwed into threaded bore holes 38. A lower side 42 of the radially protruding head of the bolts 40 permits a distance with respect to the end face of the rotary piston 33.

The rotary piston 33 cooperates with a support body 50. At its end facing the crosshead 5, the support body 50 encompasses a cylindrical exterior circumferential surface 36 of the rotary piston 33 and is sealed there by a gasket seal 51. In this manner, the support body 50 can be sealingly displaced with respect to the rotary piston 33 in the latter's axial direction.

The support body 50 has a central extension 52, concentric with respect to a cylindrical, sealed-off part 59. The extension engages in the interior opening of the rotary piston 33, and is bounded by a cylindrical inner circumferential surface 35 and sealed off there by a gasket seal 53.

On the exterior side, the support body 50 forms a type of closed cylindrical plate 56, into which blind bore holes 54 are introduced, the plate receiving the heads 43 of the bolts 40. In the base of each blind bore hole 54, a bore hole 49 is provided for the penetration of the shaft of the bolts 40. The bore hole edge of the base constitutes a projection 55 extending radially towards the inside, which grasps from below the lower side 42 of the heads 43 of the respective bolts 40.

The support body 50 can therefore be displaced radially to the outside only until it contacts the projection 55 on the lower side 42 of the bolts 40, as can clearly be seen in FIG. 2. The support body is accordingly "moored" in its position at this radially most exterior location.

In the exterior side of the plate-shaped exterior part 56 of the support body 50, a bearing pocket 60 is provided in the form of a planar recess, only a few millimeters deep, extending over a substantial portion of the cross section of the support body 50. The recess is bordered on the outside by a boundary 57 running in a closed manner over the circumference. Between the front side of the boundary 57 facing the inner circumference 2 of the hollow cylinder 1 and this inner circumference 2, there is a gap Sp. In normal operation, i.e., when hollow cylinder 1 runs concentrically and is not deformed, the gap Sp is roughly to 0.5 mm.

This means that the hydraulic fluid supplied by a line 44, overflowing through the longitudinal bore hole 39 of the bolts 40 into the bearing pocket 60, and conveyed in a quantity that is constant over time, escapes practically without a significant pressure buildup into the intermediate space between the crosshead 5 and the inner circumference 2 of the hollow cylinder 1. Since in bearing pocket 60 there is practically no pressure, according to FIGS. 1 and 2, neither is any pressure exerted to the right against the inner circumference 2 of the hollow cylinder 1.

However, if, as a result of a circumstance of any type, the hollow cylinder 1 is displaced from its normal position and approaches the support element 30, then the gap Sp is reduced and correspondingly the outflow cross-section at the circumferential edge area 57 is reduced. As a result, the pressure in the bearing pocket 60 rises and a force is exerted against the inner circumference 2 of the hollow cylinder 1, which acts to reverse the displacement that has occurred. In this manner, the hollow cylinder 1 is pressed back into the previous position with respect to the crosshead 5 and, in any event, a more pronounced deformation of the hollow cylinder 1 is made impossible, avoiding a destructive, dry friction on the inner circumference 2 of the hollow cylinder 1.

The laterally maintained position is determined by the position of the edge 57, which for its part is determined by the contact of the projection 55 on the lower side 42 of the bolts 40. A second hydraulic fluid is conveyed to the support element 30 via a second line 45. The second hydraulic fluid enters into a chamber 58 under an extension 52 of the support body 50, and exerts a force which holds the support body in contact on the underside 42 of the bolt heads 43.

The Pressure $P_{stk}$ of the line 45 can be the same as the application pressure in the chamber 26 above the connecting sleeve 12. This not only simplifies the hydraulic fluid supply, but also leads to the system pressure, by which the support body 50 is pressed against the lower side 42 of the bolt heads 43, being proportional to the application pressure of the support bar 11.

The pressure building up in the bearing pocket 60 is one measure for the magnitude of gap Sp or of the deformation of the hollow cylinder 1 perpendicular to the active plane W. This deformation, when the roller 100 is driven, is influenced by the driving power. The driving power can be too great, which has a consequence that the roller 100 tends to be displaced contrary to the direction of motion of the web. When the driving power is too small, the web tends to take the roller 100 with it and the latter is therefore displaced in the direction of motion of the fabric web. Since the roller is held securely at its ends, this leads to the corresponding deformations.

The pressure fluctuations in the bearing pocket 60 can be exploited to achieve a regulation of the driving power. Only when the hollow cylinder 1 is precisely positioned does the driving power agree with the required value. As soon as there is a deviation in the position of the hollow cylinder 1, the result in the support device 30 (or the support device opposite) is a pressure increase, which can be reversed by a corresponding change in the driving power.

In FIG. 1, a further possibility of influencing the driving power of roller 100 is represented by the dotted line. On support body 50, there is provision for two inductive measuring transducers 61, 62. The transducers are aligned on opposite sides radially perpendicular with respect to active plane W. The inductive measuring transducers are secured on the exterior side of the support body 50 and participate in the latter's motion. Pressure feet 63 and 64, emerging from the measuring transducers 61, 62, contact the exterior side of the exterior base plate 32. If the hollow cylinder 1, according to FIG. 1, is displaced to the right, the pressure feet 63, 64 are further extended and the signal emitted by the measuring transducers 61, 62 is altered accordingly. This also applies to the case in which the support body 50 approaches the base plate 32. The inductive transducers 61, 62 therefore measure the radial distance of the inner circumference 2 of the hollow cylinder 1 perpendicular to active plane W. The signals of the measuring transducers 61, 62 are averaged. Furthermore, there can be three or four measuring transducers or only one central one. It must only be established that the signal of the measuring transducer arrangement is essentially independent of the position or of the possible diagonal position of the support body 50.

The signal of the measuring transducer arrangement 61, 62 characterizes the position of hollow cylinder 1 with respect to the crosshead 5 in the lateral direction. It acts to influence the driving power such that the hollow cylinder 1 maintains the correct position and orientation. For this purpose, the measuring transducer arrangements can correspondingly to 61,62 also act alone. In the exemplary embodiment depicted, however, the signals of the measuring transducers 61, 62 cooperate with the signals of the pressure in the bearing pocket 60, to optimally control the driving power.

What is claimed is:

1. A roller for the pressure treatment of fabric webs, comprising:

a hollow cylinder that can rotate about an axis and that supports a working roller periphery;

a non-rotatable crosshead extending through the length of the hollow cylinder leaving all around a distance with respect to the inner circumference of the hollow cylinder, the crosshead supported at its ends on external support pieces;

a support device arranged on the crosshead, the support device acting radially in the active plane (W) of the roller against the inner circumference of the hollow cylinder, the support device transmitting the forces necessary for creating line forces exerted by the roller from the crosshead to the hollow cylinder, the support device having at least one hydrostatic support element arranged laterally on the crosshead and acting radially perpendicular to the active plane (W) of the roller against the inner circumference of the hollow cylinder, the hydrostatic support element being hydraulically extendable against the inner circumference of the hollow cylinder and having on the exterior side a bearing project arrangement of hydrostatic bearing pockets that are open with respect to the inner circumference of the hollow cylinder, the bearing pocket arrangement of the lateral support element being acted upon supplied in a throttle-free manner with a hydraulic fluid quantity that is constant over time; and a mechanical limit stop for limiting the lateral extension motion located on the at least one lateral support element.

2. The roller as recited in claim 1, wherein the mechanical limit stop is formed by the head of at least one bolt which is securely fixed to the crosshead and the mechanical limit stop is grasped from below by a radial projection of the at least one lateral support element.

3. The roller as recited in claim 2, wherein a blind bore hole for receiving the head of at least one bolt emerges from the base of the bearing pocket arrangement, and the bolt has an essentially throttle-free longitudinal bore hole, which is connected to a supply line of the hydraulic fluid quantity that is constant over time.

4. The roller as recited claim 1, wherein the at least one lateral support element is mechanically connected to the part of the support device that contacts the inner circumference of the hollow cylinder, and the at least one lateral support element with respect to the crosshead can be displaced in the active plane perpendicular to the roller gap.

5. The roller as recited claim 1, wherein a retaining bracket is mounted on the part of the support device that contacts the inner circumference of the hollow cylinder, the retaining bracket contacting a base plate of the support element, the base plate at a planar sliding surface being displaceable on a corresponding sliding surface on the crosshead parallel to the active plane perpendicular to the roller gap.

* * * * *

UNITED STATES PATENT AND TRADEMARK OFFICE
CERTIFICATE OF CORRECTION

PATENT NO. : 6,524,228 B1
DATED : February 25, 2003
INVENTOR(S) : Schrörs

It is certified that error appears in the above-identified patent and that said Letters Patent is hereby corrected as shown below:

<u>Title page, Item [54] and Column 1, lines 1-2,</u>
Title, change "DEFLECTION ROLLER WITH MECHANICAL TOP" to
-- ROLLER FOR THE PRESSURE TREATMENT OF FABRIC WEBS --;

<u>Column 3,</u>
Line 58, change "device, emits" to -- device emits --;

<u>Column 4,</u>
Line 14, change "transducer, can" to -- transducer can --;

<u>Column 6,</u>
Line 23, change "those showing" to -- those shown in --;

<u>Column 10,</u>
Line 25, change "recited claim" to -- recited in claim --; and change "claim 1," to
-- claim 4, --.

Signed and Sealed this

Sixteenth Day of May, 2006

JON W. DUDAS
*Director of the United States Patent and Trademark Office*